United States Patent [19]

Holtgraver

[11] Patent Number: 4,711,427
[45] Date of Patent: Dec. 8, 1987

[54] APPARATUS FOR CONNECTING A VALVE ELEMENT TO A VALVE STEM

[75] Inventor: Edward G. Holtgraver, Spring, Tex.

[73] Assignee: Keystone International, Inc., Houston, Tex.

[21] Appl. No.: 898,433

[22] Filed: Aug. 20, 1986

[51] Int. Cl.⁴ .......................... F16K 1/22; B21D 53/00
[52] U.S. Cl. .............................. 251/308; 29/157.1 A; 29/434; 29/464; 251/369
[58] Field of Search ................... 29/157.1 A, 157.1 R, 29/526 R, 469, 700, 434; 251/308, 305, 304, 298, 369

[56] References Cited

U.S. PATENT DOCUMENTS 4,483,513  11/1984  Summers .............................. 251/308

FOREIGN PATENT DOCUMENTS 915662   11/1972  Canada .................................. 251/308
2248226   4/1974  Fed. Rep. of Germany ...... 251/308
2710104   9/1977  Fed. Rep. of Germany ...... 251/308
1255873   1/1961  France ................................. 251/305

Primary Examiner—Howard N. Goldberg
Assistant Examiner—Ronald S. Wallace
Attorney, Agent, or Firm—Browning, Bushman, Zamecki & Anderson

[57] ABSTRACT

A valve stem-valve element assembly wherein a valve element is provided with a valve stem bore, a valve stem being received in the valve stem bore, there being a bore transverse to the valve stem bore in the valve element which is in register with the hole in the valve stem, a threaded bolt being received in the bore through the threaded hole threadedly engaging the threaded hole, the threaded portion of the bolt also frictionally engaging the smooth walls of the transverse bore.

7 Claims, 4 Drawing Figures

APPARATUS FOR CONNECTING A VALVE ELEMENT TO A VALVE STEM

BACKGROUND OF THE INVENTION

1. Field of the Invention

The present invention relates to an apparatus or assembly for connecting a valve element to a valve stem and, more particularly, to an apparatus for connecting the stem or shaft of a butterfly valve to the disk.

2. Description of the Prior Art

Valves employing pivotable closure elements, such as butterfly valves, are widely used in the industry for fluid handling and control. In a typical butterfly valve assembly, the disk of valve element is pivotally mounted in the flow passage of the valve body. To pivotally mount the disk in the valve so as to be able to selectively open and close the valve, it is common to use one or more stems or shafts which extend through the valve body into the flow passage and which are fixed to the disk so that rotation of the shaft or shafts results in rotation of the disk.

It is the practice in disk or butterfly valve assemblies to secure the stem to the disk by means of pins which fit in registering holes in the stem and a hub of the disk such that the disk and stem are keyed to one another. Alternately, it is common to thread the bore extending through the valve stem and use a threaded bolt which extends through a registering bore in a hub of the disk, the threaded bolt engaging the threaded bore in the stem to secure the disk to the stem. In such assemblies, because of machining tolerances and to permit fit, the bolt or pin does not frictionally engage both the core in the hub of the disk and the registering bore in the stem. The result is that bending moment if a force is applied to the disk/stem assembly, such as, for example, when the stem is rotated to position the disk in the valve.

SUMMARY OF THE INVENTION

It is therefore an object of the present invention to provide an improved apparatus for connecting a valve stem to a valve element.

Another object of the present invention is to provide an apparatus for connecting a valve stem to a valve element wherein the structural component used to secure or hug the stem to the valve element is placed in double shear by a turning force acting on the valve stem-valve element assembly.

The above and other objects of the present invention will become apparent from the drawings, the description given herein and the appended claims.

The apparatus of the present invention comprises a valve element which has a first bore for receiving a valve stem and a second bore transverse to an intersecting the first bore. The second bore has a first portion on one side of the first bore and a second portion on the opposite side of the first bore. A valve stem is received in the first bore, the valve stem having a hole therethrough, the hole being in register with the second bore in the valve element. The portion of the hole adjacent the first portion of the first bore is threaded. A retaining member is provided which is received in the second bore and extends through the hole in th valve stem. the retaining member, e.g. a bolt, has a threaded shank portion which is threadedly received in the threaded portion of the hole in the valve stem. At least one of the threads of the threaded shank portion are received in the first portion of the second bore. The first portion of the second bore, which generally will have a smooth wall surface, is dimensioned such that the thread or theads received in the first portion of the second bore will frictionally engage the wall of the first portion of the second bore and, in the preferred case, will thread into the wall surface of the first portion of the second bore.

BRIEF DESCRIPTION OF THE DRAWINGS

The invention may be more fully understood by reference to the following description of the preferred embodiment in conjunction with the drawings, wherein.

DESCRIPTION OF THE PREFERRED EMBODIMENTS

While the invention will be described with particular reference to butterfly or disk valves, it is to be understood that it is not so limited. The disk/stem connection assembly may be employed in any valve having a rotatable or movable valve closure element which is attached to a stem or shaft used to rotate or move the valve closure element. Thus, the invention may be employed in ball valves, plug valves, gate valves, etc.

Figure 2:
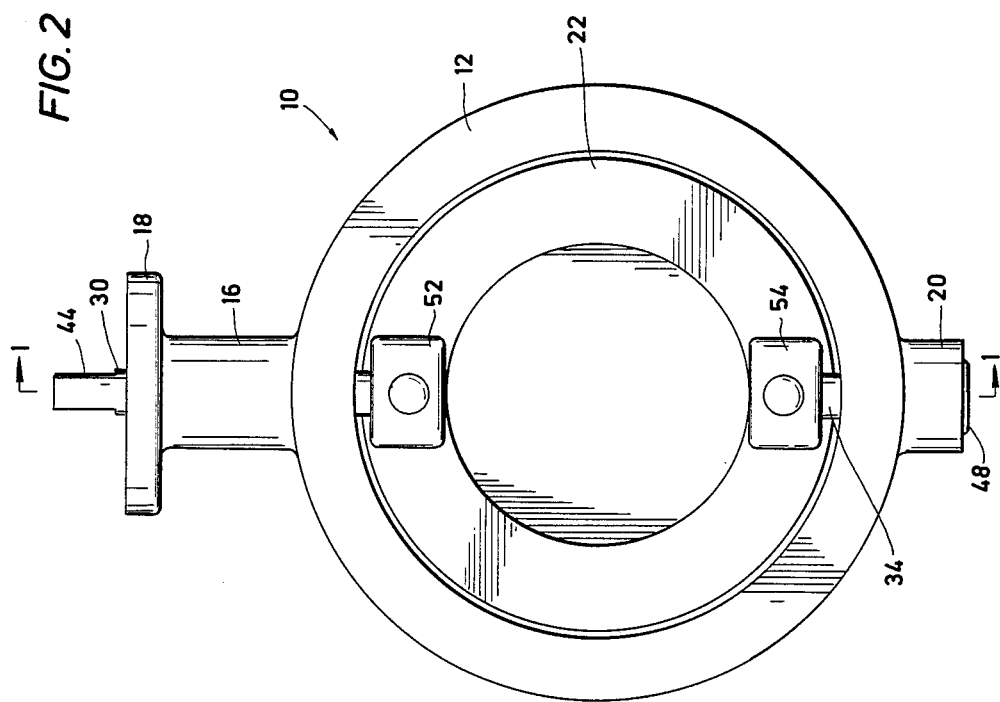
FIG. 2 is an elevational view of the butterfly valve of FIG. 1.
Figure 1:
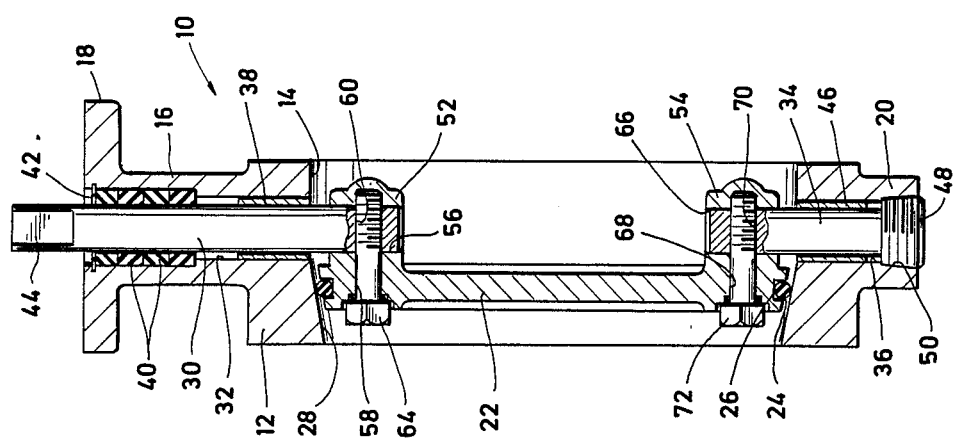
FIG. 1 is a vertical view, partly in section, of a butterfly valve incorporating the disk/stem connecting apparatus of the present invention.

Referring first to FIG. 1, there is shown a butterfly valve 10 having a generally annular body 12 with a fluid flow passage 14 therethrough. The valve body 12 is typically adapted for positioning between opposed, pipe flanges (not shown). Extending outwardly from valve body 12 is a cylindrical neck 16 integrally formed with body 12. A radially outwardly extending flange 18 formed integrally on neck 16 provides a means for securing an actuator (not shown) to valve 10. Diametrically opposite neck 16, protruding from and integrally formed with body 12, is a boss 20.

Pivotally supported in fluid flow passage 14 is a valve element, e.g., a disk 22, having an annular groove 24 around the periphery thereof, a resilient seal ring 26 being received in annular groove 24. Seal ring 26 engages a frustoconical sealing surface 28 in body 12 thereby effecting a fluid-tight seal between body 12 and disk 22 when disk 22 is in the closed position. It will be understood that in many cases sealing between disk 22 and the body 12 is accomplished by means of an annular seal resilient seat member carried by body 12 which sealingly engages the periphery of disk 22.

Disk 22 is supported by means of a first stem or stub shaft 30 positioned in a bore 32 of neck 16 and a second stem or stub shaft 34 positioned in a bore 36 in boss 20, bores 32 and 36 being coaxial. Stem 30 is journaled in bore 32 by means of a bushing 38. Sealing between stem 30 and bore 32 is provided by a stack of packing rings 40 received in bore 32 in surrounding relationship to stem 30. A snap ring 42 holds the packing rings in place. The upper end of stem 30 protrudes above circular flange 18 and is provided with opposed flats 44 to provide a means for securing a hand wheel, wrench or other device, e.g. an actuator, for rotating disk 22 to open and close the valve 10.

Stem 34 is journaled in bore 36 by means of a bushing 46, bore 36 being closed off by a plug 48 threadedly received in a threaded counterbore 50 in boss 20. It will be understood that suitable gaskets or the like may be employed to prevent fluid leakage out of bore 36.

Disk 22 is provided with first and second hubs 52 and 54, respectively, hubs 52 and 54 being positioned diametrically opposite one another. Hub 52 is provided with a first bore 56 and a second, transverse bore 58, second bore 58 extending generally through the face of disk 22, intersecting first bore 56 and terminating in a blind hole in hub 52. A threaded hole 60 extends through stem 30 transverse to the long axis of stem 30. When stem 30 is received in bore 56, threaded hole 60 is in register with second bore 58. A bolt 64 received in bore 58 threadedly engages hole 60 in stem 30 and has its end received in the blind hole portion of bore 58.

Stem 34 is received in a first bore 66 in hub 54. The hub 54 is also provided with a second bore 68 which extends through the face of disk 22 transverse to first bore 66 and terminates in a blind hole in hub 54. Stem 34 has a threaded hole 70, hole 70 being in register with bore 68 when stem 34 is received in bore 66. A bolt 72 is received in bore 68, threadedly engages threaded hole 70 and terminates in the blind hole formed in hub 54. It will thus be seen that disk 22 is affixed to stems 30 and 34 such that rotation of shaft 30 results in rotation of disk 22 in the flow passage 14.

Figure 3:
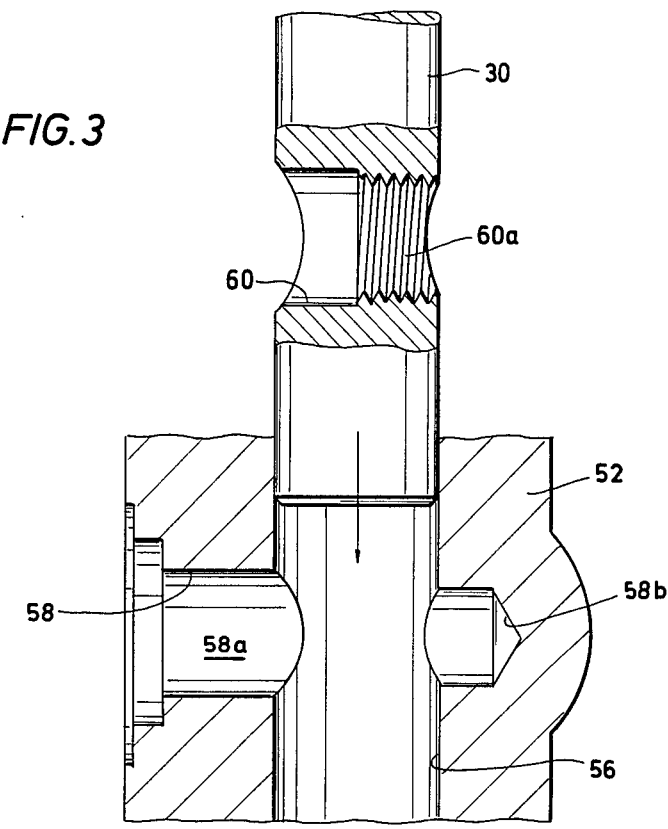
FIG. 3 is an enlarged, fragmentary section showing insertion of the stem into the bore of the disk of the valve shown in FIGS. 1 and 2.
Figure 4:
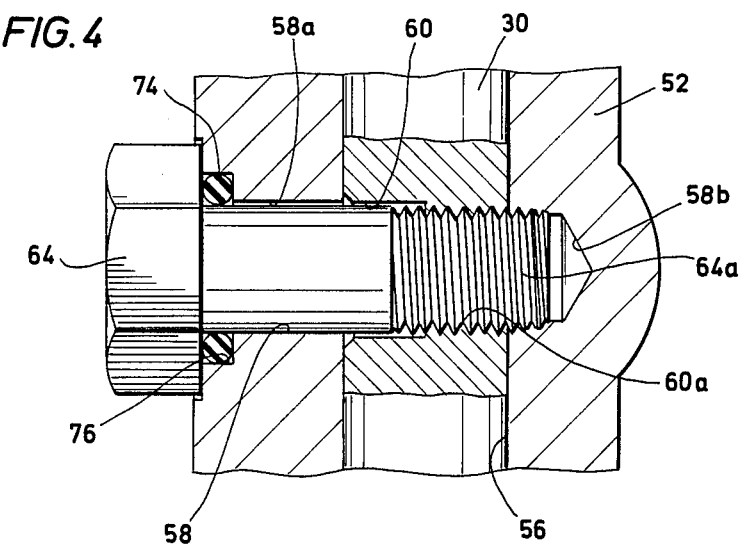
FIG. 4 is a view similar to FIG. 3 showing the stem connected to the disk using the apparatus of the present invention.

Reference is now made to FIGS. 3 and 4 for a more detailed discussion of the disk/stem assembly apparatus of the present invention. FIGS. 3 and 4 will be discussed with reference to shaft 30 and hub 52, it being understood that the description applies equally to the connection of stem 34 to hub 54. In FIG. 3, stem 30 is shown as being inserted into bore 56 and hub 52. Hole 60 in stem 30, as seen, has a threaded portion 60a. Bore 58 can be considered as having a first portion 58a and a seodnd portion 58b, the two portions lying on opposite sides of bore 56 in hub 52, second portion 58b forming the blind hole in hub 52. As seen with reference to FIG. 4, when stem 30 is received in bore 56, hole 60 will be in register with bore 58, the threaded portion 60a of hole 60 being immediately adjacent the opening to portion 58b, i.e. the blind hole portion of bore 58. To secure the stem 30 to the hub 52, bolt 64, which has a threaded shank portion 64a received in bore 58, extends into hole 60 of stem 30 and threadedly engages the threaded portion 60a of hole 60. The threaded shank portion 64a of bolt 64 also extends into portion 58b of bore 58, the threaded portion 64a engaging the cylindrical wall portion 58b. As shown, the diameter of the cylindrical wall forming second-portion 58b of bore 58 is approximately equal to the root diameter of the threaded portion of threaded shank 64a. Accordingly, when the threaded portion 64a enters the blind hole portion 58b of bore 58, the threads will cut into the wall, in effect permitting bolt 64 to thread itself into bore 58b. To prevent fluid from entering the bore 58, the O-ring 74 is received in an annular recess 76 surrounding bore 58.

It will be apparent that because the threaded shank portion 64a of bolt 64 threadedly engages the threaded portion 60a of hole 60 and threads itself into the smooth, cylindrial wall of second portion 58b of bore 58, the threaded portion 64a spans the interface between the shaft 30 and the hub 52 such that there is virtually continouus threaded engagement of bolt 64 extending from the threaded portion 60a of hole 60 into the blind hole portion 58b of bore 58 where the threaded portion 64a terminates. Because of this continuous, threaded engagement, there is no clearance between the threaded portion 64a and hence bolt 64 and the walls of bore 58b and hence hub 52, i.e. disk 22. Accordingly, there will be no play between the bolt 64 and the hub 52. When shaft 30 is rotated to effect rotation of disk 22, there will be no bending moment applied to bolt 64a along the portion that is threadedly engaged either in the threaded portion 60a of the hole 60 or in the engaged portion of the second bore 58b. Bolt 64 is thus placed in double shear when stem 30 is rotated to effect rotation of disk 22. Placing bolt 64 in double shear under the rotational forces on stem 30 provide a much stronger linkage than if there were play between bolt 64 and bore 58b which would permit a bending moment to be imposed upon bolt 64.

While in the preferred case the bore 58b will have a diameter or be dimensioned such that it will approximate the root diameter of the threaded portion 64a of the bolt 64, it is to be understood that it is only necessary that the dimensioning of bore 58b relative to the threaded shank 64a be such that when the threaded shank 64a enters bore 58b, there will be sufficient contact or frictional engagement between the walls of the bore 58b and the threaded portion 64a to preclude any play or clearance which would permit a bending moment to be set up in the bolt 64, i.e. the engagement of the threaded shank 64a with the walls 58b must be such as to place the bolt 64 in double shear when stem 30 is rotated.

While the invention has been described with respect to the use of dual stems connected to the disk, it is to be understood that in some butterfly valves a single stem is used to support the disk and that the apparatus of the present invention is equally useful with such single stem butterfly valves.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. In a rotary valve having a valve body a valve element, a valve stem, and a first bore in said valve element for receiving said valve stem for rotatably mounting said valve element in said valve body, the improvement comprising:

a second bore transverse to and intersecting said first bore, said second bore having a first portion on one side of said first bore and a second portion on the diametrically opposite side of said first bore;

said valve stem having a hole therethrough, said hole being in register with said second bore in said valve element, the portion of said hole adjacent said second portion of said second bore being threaded;

a retaining member received in said second bore and extending through said hole, said retaining member having a threaded shank portion, said threaded shank portin being threadedly received in said threaded portion of said hole in said valve stem, at least one of the threads of said shank portion being received in said second portion of said second bore, said second portion of said second bore being dimensioned such that said at least one thread of said threaded portion of said shank portion frictionally engages the wall of said second portion of said second bore, said second portion of said second bore being positioned such that said threaded shank portion and said threaded hole are engaged before said at least one of the threads of said threaded shank portion is received in said second portion of said second bore.

2. The apparatus of claim 1 wherein said second portion of said second bore has a diameter substantially the same as the root diameter of the threaded portion of said shank portion.

3. The apparatus of claim 2 wherein the wall of said first portion is a generally smooth, cylindrical surface.

4. The apparatus of claim 1 wherein said retaining member has a head portion of greater lateral dimension than said shank portion, said head portion engaging said valve element.

5. The apparatus of claim 1 wherein said valve element comprises a disk.

6. The apparatus of claim 5 wherein said disk includes first and second, spaced hub portions, each of said hub portions having a first bore.

7. The apparatus of claim 6 including first and second valve stems, said first sem being received in said first bore in said first hub, said second stem being received in said first bore in said second hub.

* * * * *